United States Patent [19]

Bergquist

[11] Patent Number: 4,749,005
[45] Date of Patent: Jun. 7, 1988

[54] COMBINED GAS PRESSURE REGULATOR AND SHUT OFF VALVE

[75] Inventor: Frank H. Bergquist, Wheaton, Ill.

[73] Assignee: Eaton Corporation, Cleveland, Ohio

[21] Appl. No.: 53,508

[22] Filed: May 15, 1987

Related U.S. Application Data

[63] Continuation of Ser. No. 847,494, Apr. 2, 1986, abandoned, which is a continuation of Ser. No. 671,925, Nov. 16, 1984, abandoned.

[51] Int. Cl.$^4$ .............................................. F16K 17/02
[52] U.S. Cl. .................................... 137/877; 137/881; 137/505.35; 251/263
[58] Field of Search .......................... 251/251, 263; 137/505.35, 505.36, 877, 881, 883

[56] References Cited

U.S. PATENT DOCUMENTS

| | | | |
|---|---|---|---|
| 713,856 | 11/1902 | Compton | 137/505.35 |
| 1,143,504 | 6/1915 | Carjulo | 126/39 E |
| 1,689,955 | 10/1928 | Meacham | 126/39 N |
| 2,087,443 | 7/1937 | Newell | 137/881 |
| 2,308,570 | 1/1943 | Sherman | 126/39 G |
| 2,726,653 | 12/1955 | Strobel | 126/42 |
| 2,757,683 | 8/1956 | Biggle | 137/505.36 |
| 3,207,472 | 9/1965 | Seltsam | 251/263 |
| 3,337,184 | 8/1967 | Koch | 251/263 |
| 3,419,246 | 12/1968 | Burgess | 251/263 |
| 3,804,118 | 4/1974 | Love | 137/608 |
| 3,885,589 | 5/1975 | Lung | 137/613 |

FOREIGN PATENT DOCUMENTS

| | | | |
|---|---|---|---|
| 523773 | 4/1955 | Italy | 263/ |
| 559372 | 3/1957 | Italy | 251/263 |

*Primary Examiner*—Samuel Scott
*Assistant Examiner*—Noah Kamen
*Attorney, Agent, or Firm*—R. A. Johnston

[57] ABSTRACT

A gas stove (A) includes a combined pressure regulator and manual shut off valve (C) which has an inlet (46) connected with a source (B) of natural gas. The combined valve includes a pressure regulator (60) in fluid communication with the inlet through a regulating valve assembly (64, 66). The regulating valve assembly which controls the flow of gas to a regulator chamber (62) is controlled by a diaphragm (68) and a spring (70) to maintain the pressure in the chamber substantially constant. A first outlet (48) is connected by a passage (72) directly with the regulator chamber for supplying pressure regulated gas to a plurality of range burner control valves (20) and range burners (22). A poppet valve (80) having only two stable states, fully open and fully closed, is connected between the regulator chamber and a second outlet (50). A manually graspable lever (52) and a cam member (86) enable the state of the poppet valve to be controlled. The second outlet is connected with an oven assembly including an electrically operated oven gas supply valve (30) which supplies gas to an oven burner (32) under the control of a temperature monitor (34).

5 Claims, 4 Drawing Sheets

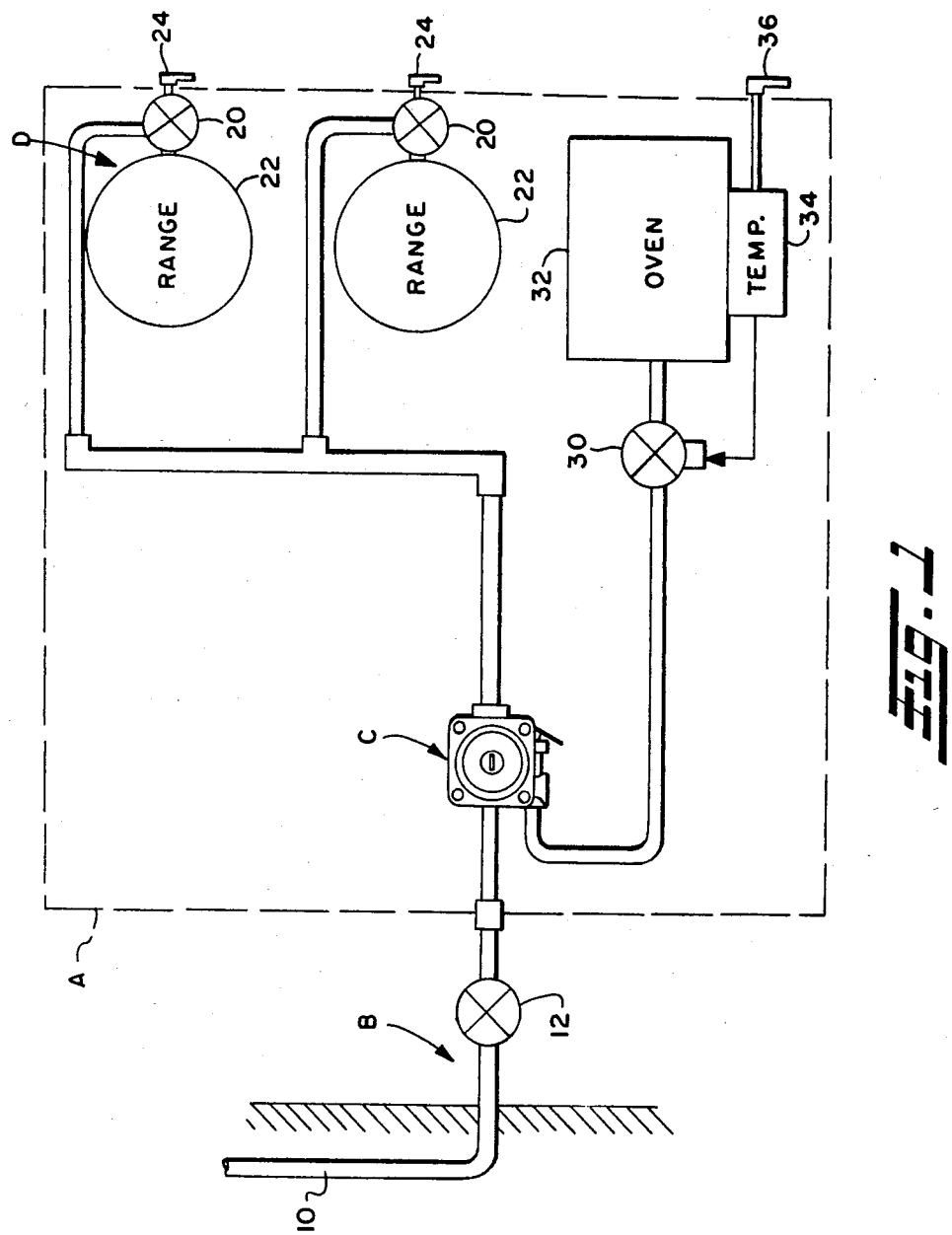

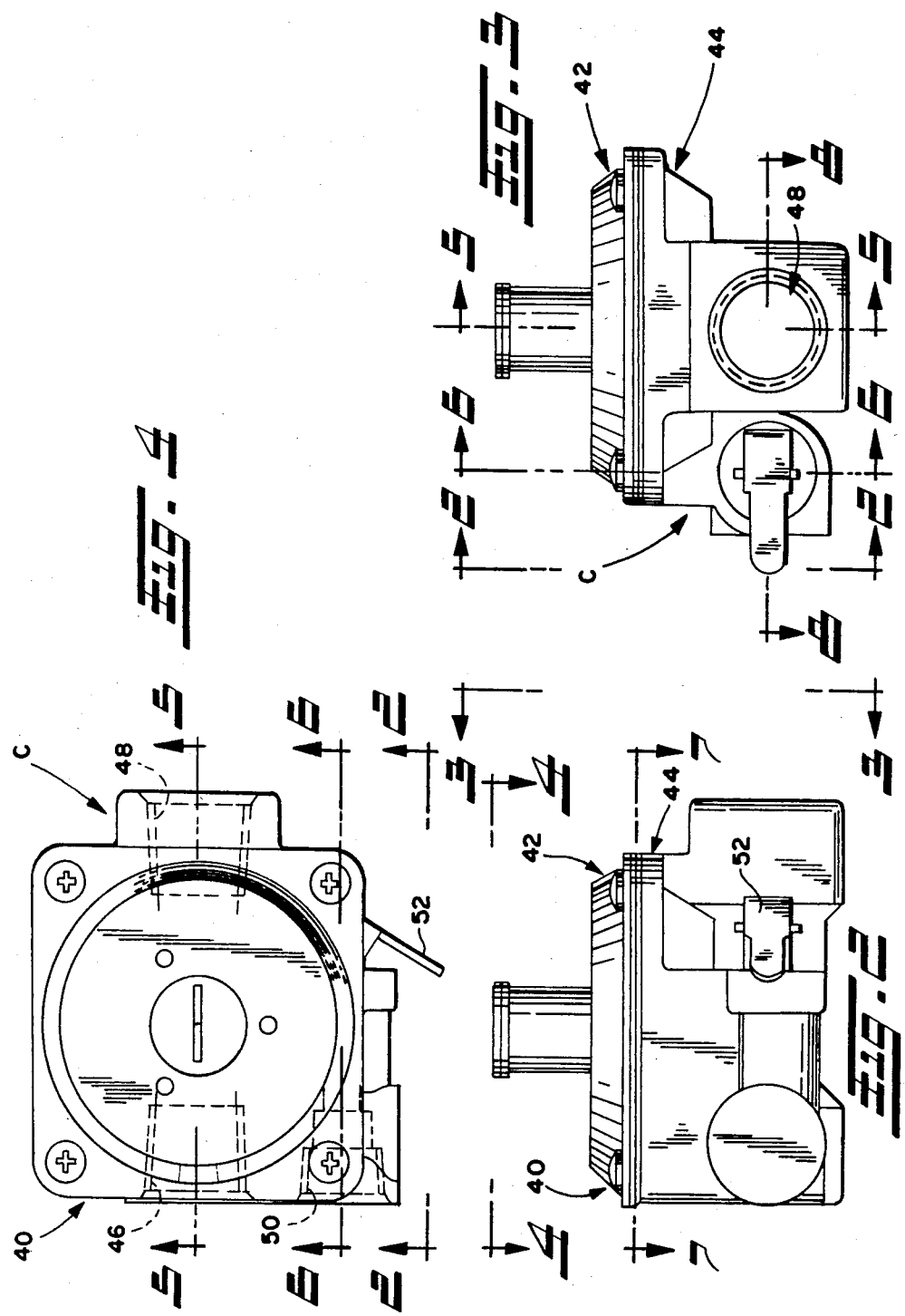

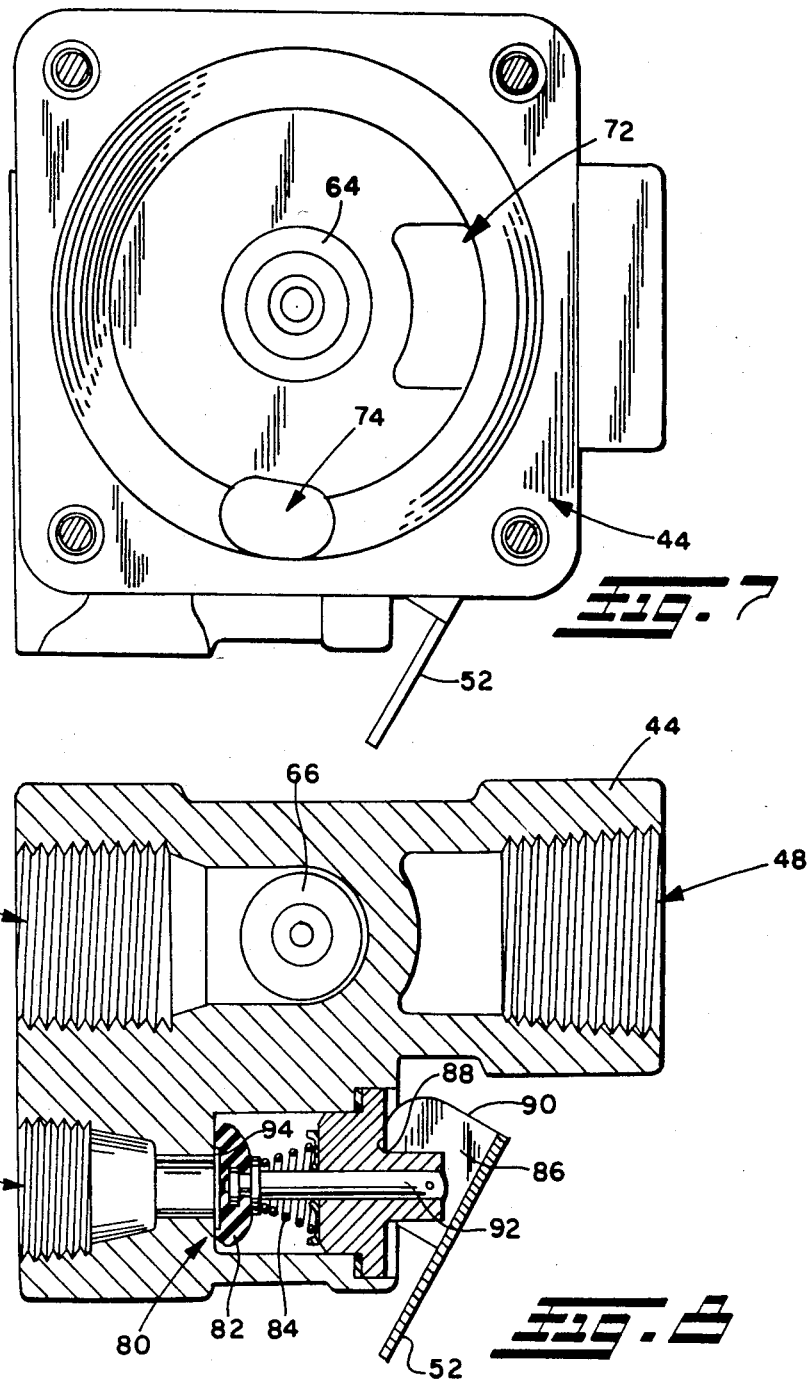

COMBINED GAS PRESSURE REGULATOR AND SHUT OFF VALVE

This is a continuation of Ser. No. 847,494, filed Apr. 2, 1986, now abandoned, which is a continuation of Ser. No. 671,925, filed Nov. 16, 1984, now abandoned.

BACKGROUND OF THE INVENTION

The present invention relates to the art of fluid control apparatus. The present invention finds particular application in conjunction with the control of gas in gas stoves and will be described with particular reference thereto. It is to be appreciated, however, that the present invention might also find utility in conjunction with other gas fired apparatus, gas powered consumer products, and other application which utilize a pressure regulated fluid supply.

Because substantially all building codes require a manual shut off valve on a gas line adjacent a connection fitting for a stove or other gas appliance, gas stoves commonly have has no internal main gas shut off valve. Rather, a pressure regulator valve adjacent the rear of the stove was connected directly with the external gas supply line. The pressure regulator valve was connected with a manifold disposed more centrally within the stove which supplied gas to each of the range burners and the oven. More specifically, a manual gas control valve was interconnected between the manifold and a corresponding range burner. The range manual control valves were configured for selectively varying, including terminating, the gas flow to the range burners. Thus, the manual range burner control valves enabled the flow of gas to the range burners to be terminated to facilitate safe replacement of repair of a defective range burner.

The oven assembly commonly included an electrically operated valve controlled by a temperature control circuit for selectively supplying gas to the oven burners for maintaining the oven at a preselected temperature. To enable the oven burners, oven temperature control circuit, and electrically operated oven control valve to be replaced safely and without a gas leak, a manually operated, tapered plug rotary shut off valve was disposed between the manifold and an oven assembly.

One of the drawbacks with the prior art stove system resided in the tubing requirements. The mainfold in which the tapered plug oven shut-off valve was commonly mounted, was disposed adjacent the top front of the stove to facilitate interconnection with the range burner controls. The gas inlet for the oven burners was commonly disposed at the lower rear of the stove. Sufficient gas tubing was required to pass the oven gas from the gas line entry at the rear of the stove, through the tapered plug valve at the front of the stove, and back to the oven burner inlet at the rear of the stove.

Another drawback resided in the basic design and operation of tapered plug valves. Although the tapered plug valve was intended to be used as a two-state valve, either full open or full off, it was able to assume partially open states. This raised the potential for the tapered plug valve to be partially open and allow gas to escape during replacement and repair of the oven assembly. Conversely, this enabled the tapered plug valve to be less than fully open when the oven was functioning and reduce the gas supply below the minimum safe supply rate and pressure.

In accordance with the present invention, there is provided a combined pressure regulator and manual shut off valve particularly adapted for gas stoves which overcomes the above-referenced problems and others.

SUMMARY OF THE INVENTION

In accordance with a first aspect of the present invention, a combined pressure regulator and manual shut off valve is provided. The valve includes a valve housing which defines a fluid inlet, a first fluid outlet, and a second fluid outlet. A pressure regulator is mounted within the housing and in fluid communication with the inlet to receive a fluid whose pressure is to be regulated. The first outlet is connected in fluid communication with the pressure regulator to receive the pressure regulated fluid therefrom. A manual shut off is also mounted in the housing in fluid communication with the pressure regulator to receive pressure regulated fluid therefrom. The manual shut off is connected in fluid communication with the second outlet for selectively supplying pressure regulated fluid thereto.

In accordance with a more limited aspect of the present invention, the manual shut off is bistable. The only two stable states are full open and full closed.

In accordance with another aspect of the invention, the combined valve is disposed within a gas stove. The inlet is connected with a main shut off valve exterior of the stove which, in turn, is connected with a gas supply line. The first outlet is connected with at least a first burner control valve for controlling gas flow to a corresponding range burner. The second valve outlet is connected with an oven gas supply valve for selectively supplying gas to an oven burner for heating an oven chamber. A temperature monitor monitors temperature in the oven chamber and controls the oven gas supply valve in accordance with the monitored temperature.

A first advantage of the present invention is that it simplifies the arrangement of gas flow tubing within a gas stove to facilitate manufacture and repair.

Another advantage of the present invention is that it reduces the cost of manufacturing gas stoves by decreasing the amount of gas tubing required and simplifying manufacture.

Yet another advantage of the present invention is that it provides greater safety through the use of a two-state shut off valve.

Still further advantages of the present invention will become apparent to those of ordinary skill in the art upon reading and understanding the following detailed description of the preferred embodiment.

BRIEF DESCRIPTION OF THE DRAWINGS

The invention may take form in various parts and arrangements of parts. The drawings are only for purposes of illustrating a preferred embodiment of the invention and are not to be construed as limiting it. Wherein the figures show:

FIG. 1 is a diagrammatic illustration of a stove assembly in accordance with the present invention;

FIG. 2 is a side elevational view of a combined pressure regulator and shut off valve in accordance with the present invention;

FIG. 3 is an end elevational view of the valve of FIG. 2;

FIG. 4 is a top plan view of the valve of FIGS. 2 and 3;

FIG. 7 is a sectional view through section 7—7 of FIG. 2; and

FIG. 8 is a sectional view through section 8—8 of FIG. 3.

DETAILED DESCRIPTION OF THE PREFERRED EMBODIMENT

Figure 5:
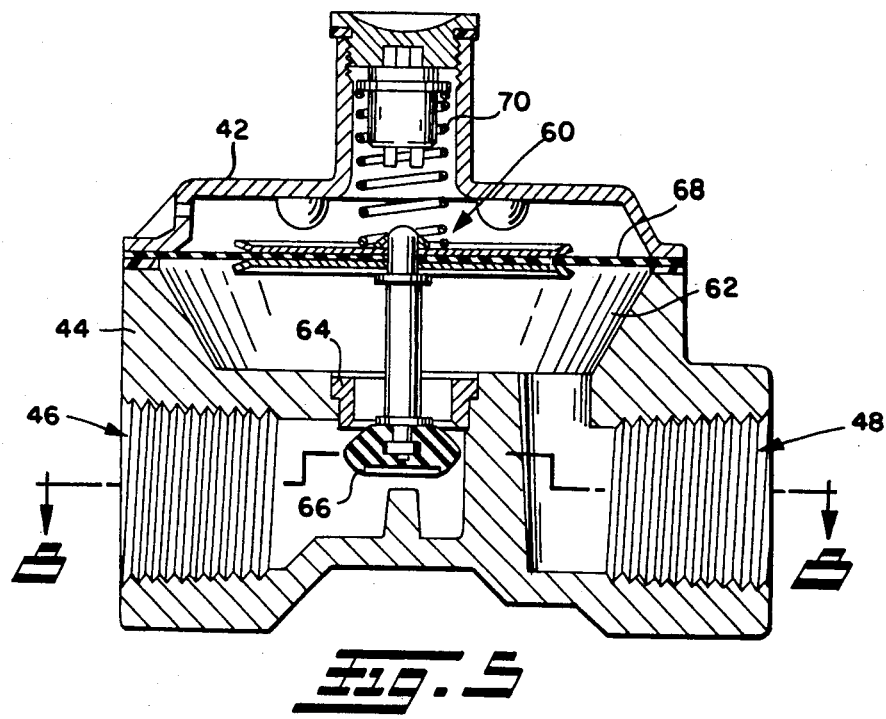
FIG. 5 is a sectional view through section 5—5 of FIGS. 3 and 4.

With reference to FIG. 1, a gas stove A is connected with a gas supply source B. Commonly, the gas supply source includes a gas supply line 10 extending through a wall of a dwelling. A main or gas line supply shut off valve 12 is mounted to the gas supply line adjacent its emergency from the wall for terminating the flow of gas when no appliance is connected thereto.

The stove A includes a combined pressure regulator and manual shut off valve C which receives gas from the main shut off valve and supplies gas at regulated pressure to a plurality of range burner assemblies D. Further, the combined valve both controls the flow and regulates the pressure of gas supplied to an oven assembly E.

Each range burner assembly includes a range control valve 20 for controlling the amount of gas supplied to a range burner 22. A manually operable control or handle 24 is connected with the range control valve 20 for selectively controlling the amount of gas supplied to the range burner.

The oven assembly E includes an electrically operated oven gas valve 30 which is connected with an oven burner box 32 for heating an oven chamber. A temperature monitor or control 34 monitors the temperature in the oven chamber and controls the electrically operated oven gas valve 30 in accordance therewith. More specifically, a manually operated control or handle 36 is connected with the temperature monitor for setting a selected oven temperature. The temperature monitor 34 opens the oven gas valve 30 in response to the temperature in the oven chamber drops below the selected oven temperture by more than a preselected amount and closes the valve in response to the oven reaching or exceeding the preselected temperature.

With reference to FIGS. 2, 3, and 4, the combined valve C has a valve housing 40, including an upper portion 42 and a lower portion 44. The housing defines a fluid or gas inlet 46 for receiving natural gas or other fluid from the gas supply B, or the like. The housing further defines a first or uncontrolled pressure regulated fluid outlet 48 and a second or controlled pressure regulated fluid outlet 50. A manually operated flow control member 52 is mounted adjacent the housing for selectively enabling and blocking the second controlled outlet 50 from discharging pressure regulated gas.

With particular reference to FIGS. 5 and 7, the combined valve includes a pressure regulator 60 for regulating the pressure of gas flowing therethrough. The pressure regulator includes a gas receiving regulator chamber 62 which is operatively connected with the fluid inlet 46 through a valve seat 64. A regulator member or poppet 66 disposed adjacent the valve seat 64 is connected with a diaphragm 68 for movement therewith. As shown in FIG. 5, the seating surface of the valve seat 64 and the corresponding mating surface of poppet 66 are preferably formed with a tapered or conical configuration. The regulator member selectively increases and decreases gas flow through the valve seat such as to maintain a substantially constant pressure in the regulator chamber 62. The diaphragm and regulator poppet are constructed of natural gas compatible material, such as synthetic polymers, metals, and the like.

The regulator diaphragm 68 is biased by gas pressure in the regulator chamber 62 to move the regulator member 66 toward the valve seat 64 cutting off the flow of gas to the chamber. The diaphragm 68 is also biased by a spring 70 to move the regulator member 66 away from the valve seat 64 allowing more gas to enter the chamber. In this manner, the pressure in the regulator chamber 62 is controlled in conformity with the pressure applied by spring 70. If the pressure in the regulator chamber 62 should exceed the spring pressure, the flow of incoming gas thereto is reduced reducing the pressure therein. If the pressure in the regulator chamber 62 falls below the spring pressure, an increased flow of gas is permitted raising the pressure.

The first or uncontrolled outlet 48 is connected by a passage 72 defined in the valve housing with the regulator chamber 62 to receive gas at the regulated pressure therefrom. The housing further defines a second regulator chamber outlet passage 74 which conveys pressure regulated gas from the regulator chamber 62 to a two-state shut off or poppet valve 80.

Figure 6:
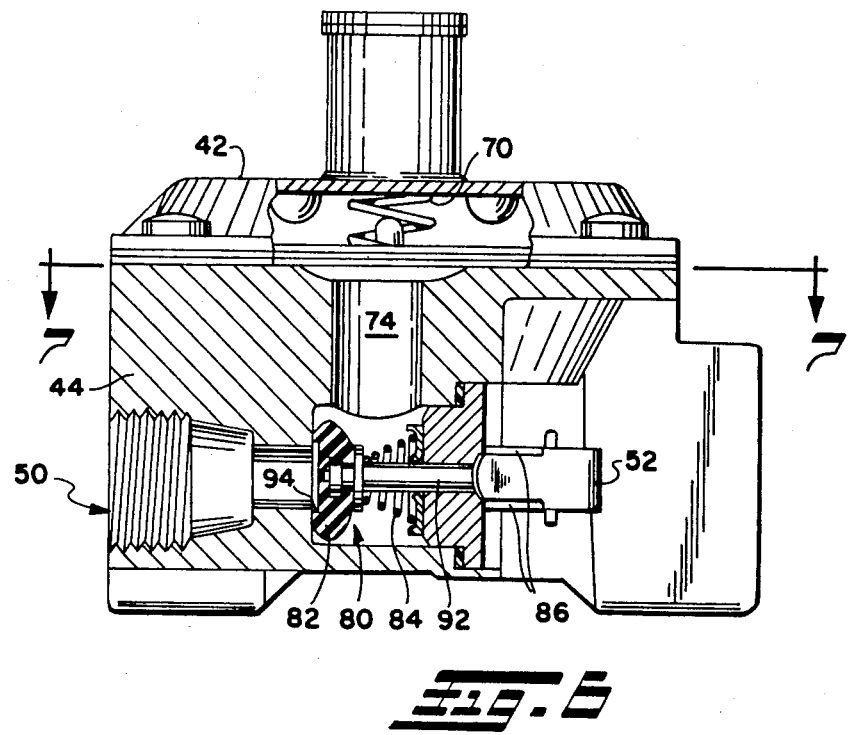
FIG. 6 is a sectional view through section 6—6 of FIGS. 3 and 4.

With particular reference to FIGS. 6 and 8, the two-state shut off 80 includes a closure or poppet member 82 which is biased by a spring 84 or other biasing means to block the second outlet 50. The manual control member 52 is integrally connected with a cam member 86 having a first or valve closed cam surface 88 and a second or valve open cam surface 90. The handle 52 and cam 86 are connected by an axially slidable plunger 92 with the closure member or poppet 82. Axial sliding movement of the plunger moves the poppet member perpendicular to an associated valve seat 94 to block and permit fluid flow therethrough. As shown in FIGS. 6 and 8, the valves seat 94 preferably has a generally flat configuration. When the first cam surface 88 rests against the valve, the plunger is free to move and the spring 84 biases the poppet 82 to a closed position. When the second cam surface 90 rests against the valve, the plunger 92 is held outward and the poppet is held away from the valve seat, i.e. the valve is open. Between the first and second cam surfaces, the cam member has a rounded or unstable cam surface such that if one were to attempt to position the handle thereon, the spring 84 would bias the cam member to rotate to one of the first and second cam surfaces. In this manner, the bistable shut off or poppet valve 80 is constrained to two states—a full open state and a fully closed or shut off state.

The invention has been described with reference to the preferred embodiment. Obviously, modifications and alterations will occur to those of ordinary skill in the art upon reading and understanding the preceding specification. It is intended that the invention be construed as including all such alterations and modifications insofar as they come within the scope of the appended claims or the equivalents thereof.

Having thus described a preferred embodiment, the invention is now claimed to be:

1. A combination shut-off valve and pressure regulator assembly for gas stoves and the like comprising:
   (a) an integral valve block defining a gas inlet, a first gas outlet and a second gas outlet;
   (b) a regulator chamber cavity defined by the integral block;

(c) a flexible diaphragm closing said cavity and forming a regulating chamber and movable in response to pressure changes in said chamber;
(d) said block defining a first valving passage communicating said chamber with said first outlet and a first valve seat disposed in said passage and having a generally tapered configuration;
(e) a regulator valve member having a first generally tapered valving surface thereon disposed for movement with respect to said first valve seat and means connecting said first valve member with said diaphragm for movement therewith for regulating flow to said first outlet;
(f) said block defining a second valving passage communciating said chamber with said second outlet and a second valve seat disposed in said passage and having a generally flat configuration;
(g) a shut-off valve member having a second annular valving surface theron configured for seating against said flat configuration operative upon manual movement to move between a position contacting said second valve seat for preventing flow from said chamber to said second outlet and a position spaced from said second valve seat for permitting flow from said chamber to said second outlet; and,
(h) said first and second valve members being interchangeable and having a common configuration with said first tapered valving surface formed on one side of said member and said second valving surface formed on the opposite side of said member.

2. The asssembly defined in claim 1, wherein said first and second valve members comprise commonly configured elastomeric poppets.

3. A combination shut-off valve and pressure regulator assembly for fuel gas fired appliances comprising;
(a) an integral valve block defining a gas inlet, a first gas outlet and a second gas outlet;
(b) a pressure regulating valve receiving gas from said inlet and supplying regulated flow to said first and second outlet, said regulating valve including a tapered valve seat and a popped movable with respect thereto, and having a tapered valving surface;
(c) a manually operated shut-off valve disposed in the flow path to said second outlet, said shut-off valve having a generally flat valve seat and a poppet having a valving surface configured to seal against said flat valve seat; and,
(d) said regulator poppet and said shut-off poppet being interchangeable and formed of a common configuration with said tapered regulator valving surface disposed on one side of said common configuration and said shut-off valving surface disposed on the opposite side of said common configuration.

4. The combination defined in claim 3 wherein, said regulator poppet and said shut-off poppet are of identical shape and size.

5. The combination defined in claim 3, wherein said regulator poppet and said shut-off poppet are formed of a common elastomeric material.

* * * * *